United States Patent [19]

Kheraluwala et al.

[11] Patent Number: 5,500,791
[45] Date of Patent: Mar. 19, 1996

[54] POWER DISTRIBUTION SYSTEM FOR GENERATING REGULATED DC OUTPUT VOLTAGES USING A DUAL ACTIVE BRIDGE CONVERTER DRIVEN FROM AN UNREGULATED DC SOURCE

[75] Inventors: Mustansir H. Kheraluwala, Niskayuna; Michael J. Schutten, Rotterdam, both of N.Y.

[73] Assignee: General Electric Company, Schenectady, N.Y.

[21] Appl. No.: 326,905

[22] Filed: Oct. 21, 1994

[51] Int. Cl.$^6$ .......................... H02M 3/335; H02M 3/24
[52] U.S. Cl. ................................................ 363/17; 363/98
[58] Field of Search .................. 363/16, 17, 97, 363/98, 131, 132

[56] References Cited

U.S. PATENT DOCUMENTS

| | | | |
|---|---|---|---|
| 4,525,774 | 6/1985 | Kino et al. | 363/17 |
| 4,761,727 | 8/1988 | Kammiller | 363/98 |
| 4,860,184 | 8/1989 | Tabisz et al. | 363/17 |
| 5,027,264 | 6/1991 | DeDoncker et al. | 363/16 |
| 5,198,969 | 3/1993 | Redl et al. | 363/17 |
| 5,245,520 | 9/1993 | Imbertson | 363/17 |
| 5,351,179 | 9/1994 | Tsai et al. | 363/17 |
| 5,355,294 | 10/1994 | De Doncker et al. | 363/17 |

OTHER PUBLICATIONS

R. W. A. A. DeDoncker, D. M. Divan, M. H. Kheraluwala, "A Three–Phase Soft–Switched High–Power–Density dc/dc Converter for High–Power Applications," IEEE Tran. on Industry Applications, Jan./Feb. 1991, vol. 27, No. 1, pp. 63–73.

M. H. Kheraluwala, R. W. DeDoncker, "Analysis, Design and Experimental Evaluation of a High–Power High–Frequency Bi–Directional DC/DC Converter," EPE Conference, Firenze, Italy, 1991, pp. 1–6.

M. H. Kheraluwala, D. W. Novotny, D. M. Divan, "Coaxially Wound Transformers for High–Power High–Frequency Applications," IEEE Transactions on Power Electronics, vol. 7, No. 1, Jan. 1992, pp. 54–62.

R. W. DeDoncker, M. H. Kheraluwala, "Unity Power Factor Control For Dual Active Bridge Converter," Serial No. 07/981,670 (GE Docket No. RD–21,269), filed Nov. 29, 1992, allowed May 2, 1994.

R. L. Steigerwald, M. H. Kheraluwala, "Efficient, High Power Density, High Power Factor Converter for Very Low DC Voltage Applications," Serial No. 08/215,149 (GE Docket No. RD–22,136), filed Mar. 21, 1994.

R. L. Steigerwald, G. W. Ludwig, "Square–Wave Converters with Soft Voltage Transitions for AC Power Distribution Systems," Ser. No. 08/055,600 (GE Docket No. RD–22,000), filed May 3, 1993.

*Primary Examiner*—Matthew V. Nyugen
*Attorney, Agent, or Firm*—Jill M. Breedlove; Marvin Snyder

[57] ABSTRACT

A power distribution system including a dual active bridge converter (DABC) distributes a regulated high-frequency, edge-resonant, square wave ac output voltage from an unregulated dc voltage source. The DABC-includes a primary-side half-bridge connection of switching devices and a secondary-side half-bridge connection of switching devices which are coupled by an intermediate high-frequency transformer. An ac distribution bus is connected to the regulated secondary side of the transformer. The primary-side and secondary-side connections of switching devices are phase-shifted in a manner to provide a regulated high-frequency square-wave voltage on the ac distribution bus, which is distributed via a low-impedance distribution bus to a plurality of simple point-of-load converters. Alternatively, a plurality of DABC's is configured in a high-frequency ac power distribution system such that a primary-side half-bridge of switching devices converts an unregulated dc voltage source to an unregulated high-frequency, square wave ac voltage which is distributed to a plurality of point-of-load converters. Each point-of-load converter has a high-frequency transformer and secondary-side switching devices, such that each point-of-load converter forms a DABC pair with the primary-side half-bridge.

13 Claims, 3 Drawing Sheets

POWER DISTRIBUTION SYSTEM FOR GENERATING REGULATED DC OUTPUT VOLTAGES USING A DUAL ACTIVE BRIDGE CONVERTER DRIVEN FROM AN UNREGULATED DC SOURCE

FIELD OF THE INVENTION

The present invention relates generally to power converters and, more particularly, to efficiently generating multiple regulated dc output voltages using an intermediate distributed high-frequency ac link of a dual active bridge converter driven from an unregulated dc source.

BACKGROUND OF THE INVENTION

Conventional power delivery systems distribute dc or low-frequency (e.g., 50–60 Hz) voltages. Unfortunately, such systems require relatively inefficient and bulky converters with a fairly high part count and cost for each electrical point-of-load.

Accordingly, it is desirable to provide an efficient, high-power-density, high-frequency ac power system for generating multiple regulated dc output voltages for a plurality of point-of-load power converters.

SUMMARY OF THE INVENTION

A power distribution system, comprising a dual active bridge converter (DABC), distributes a high-frequency (e.g., 100 kHz), edge-resonant, square wave ac output voltage from an unregulated dc voltage source. In a preferred embodiment, the DABC comprises a primary-side half-bridge connection of switching devices and a secondary-side half-bridge connection of switching devices which are coupled by an intermediate high-frequency transformer with a predetermined series inductance. An ac distribution bus is connected to the regulated secondary side of the transformer. Compensation capacitors coupled across the secondary-side half-bridge are provided for energy storage. The primary-side and secondary-side connections of switching devices are phase-shifted in a manner to provide a regulated high-frequency square-wave voltage on the ac distribution bus which is distributed via a low-impedance distribution bus to a plurality of simple point-of-load ac-to-dc converters. The point-of-load converters may simply comprise transformer-coupled diode rectifiers and, if desired, simple follow-on linear or switching regulators for finer regulation.

In another preferred embodiment, a plurality of DABC's are configured in a high-frequency ac power distribution system such that a primary-side half-bridge of switching devices converts an unregulated dc voltage to an unregulated high-frequency, edge-resonant, square wave ac voltage which is distributed to a plurality of point-of-load converters. Each point-of-load converter comprises a high-frequency point-of-load transformer with switching devices on the secondary side thereof. The secondary-side devices are appropriately phase-shifted from the primary-side unregulated high-frequency ac voltage to provide the desired point-of-load regulated output dc voltages. Each point-of-load converter thus comprises the secondary side of the DABC. The inductance of the distribution bus or point-of-load transformer is advantageously utilized for efficient DABC operation. In addition, the secondary-side switching devices preferably comprise synchronous rectifiers for high efficiency rectification and tight regulation.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
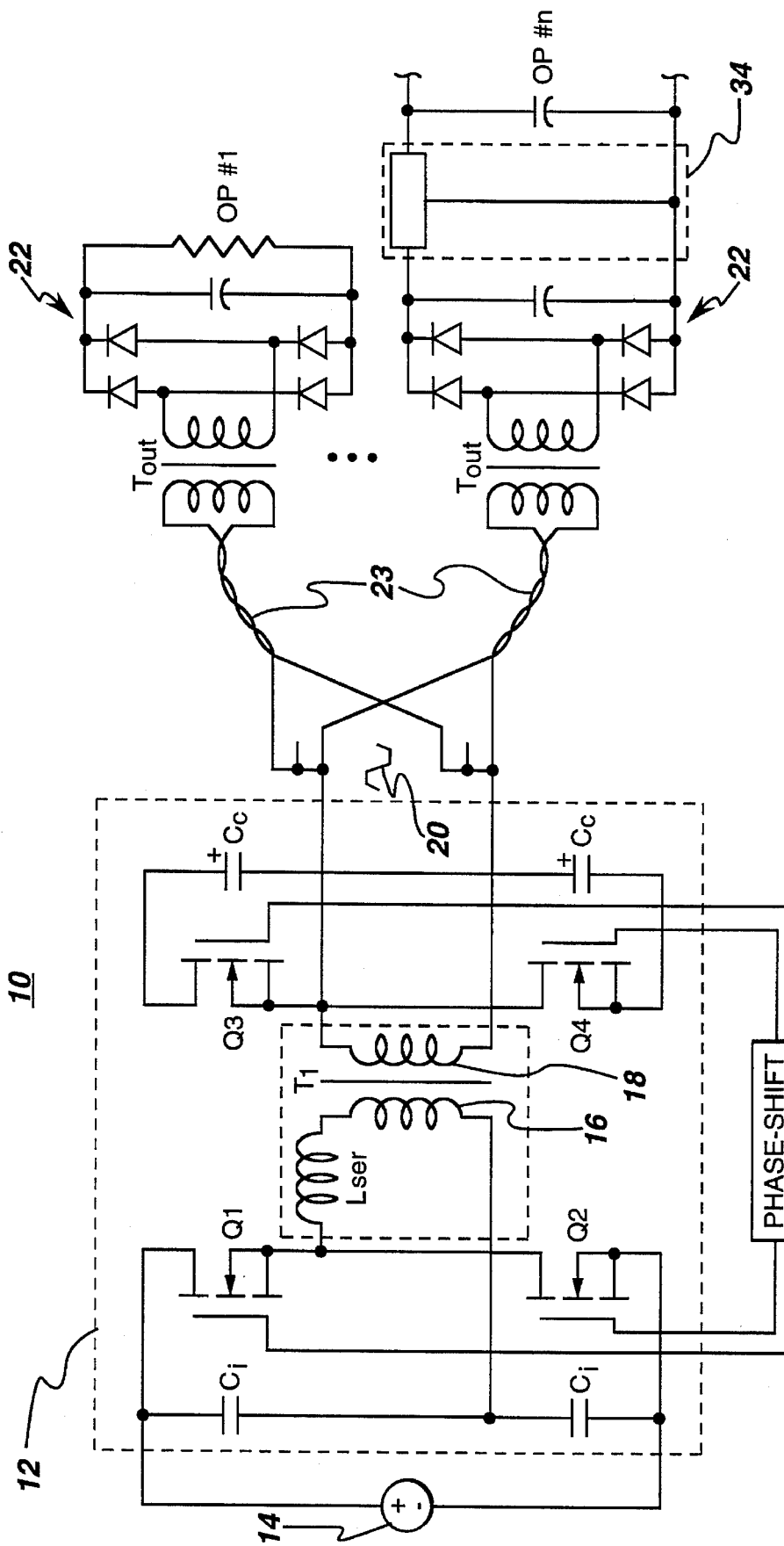
FIG. 1 schematically illustrates a preferred embodiment of a power distribution system according to the present invention.

FIG. 1 illustrates a power distribution system 10 comprising a dual active bridge converter (DABC) 12. A DABC is described in "A Three-Phase Soft-Switched High-Power-Density dc/dc Converter for High-Power Applications" by Rik W. A. A. De Doncker, Deepakraj M. Divan, and Mustansir H. Kheraluwala, *IEEE Transactions on Industry Applications*, Vol. 27, No. 1, February 1991, which is incorporated by reference herein. The DABC comprises a primary-side connection of switching devices Q1 and Q2 coupled in a halfbridge configuration across a pair of input capacitors Ci and an unregulated dc Voltage source 14. A primary winding 16 of an intermediate high-frequency transformer T1 has one terminal connected to the junction joining the input between the input capacitances and the other terminal connected to the junction between switching devices Q1 and Q2. Transformer T1 has a predetermined series inductance Lser which comprises either the leakage inductance of transformer T1 or a separate inductor or a combination of both, as described in U.S. Pat. No. 5,027,264 of Rik W. A. A. De Doncker, Deepakraj M. Divan, and Mustansir H. Kheraluwala, issued Jun. 25, 1991 and incorporated by reference herein. One terminal of a secondary winding 18 of transformer T1 is connected to the junction joining a secondary-side bridge connection of switching devices Q3 and Q4. The other terminal of secondary winding 18 is connected to the junction between a pair of compensation capacitors Cc coupled across the secondary-side half-bridge for local energy storage. The two terminals of secondary winding 18 are also connected across a regulated high-frequency, edge-resonant, square wave ac voltage bus 20. A plurality of point-of-load power converters 22 are coupled via a low-impedance distributed bus 23, such as, for example, a twisted pair of wires or a coaxial cable, and output transformers Tout to the regulated ac voltage bus 20.

In operation, a controller 30, such as of a type described in U.S. Pat. No. 5,027,264, cited hereinabove, controls the phase shift between the primary-side and secondary-side half-bridge connections of switching devices Q1–Q2 and Q3–Q4, respectively, to provide a regulated edge-resonant, square wave voltage on high-frequency ac bus 20. The regulated high-frequency ac voltage is efficiently distributed via the plurality of point-of-load converters 22.

Figure 2:
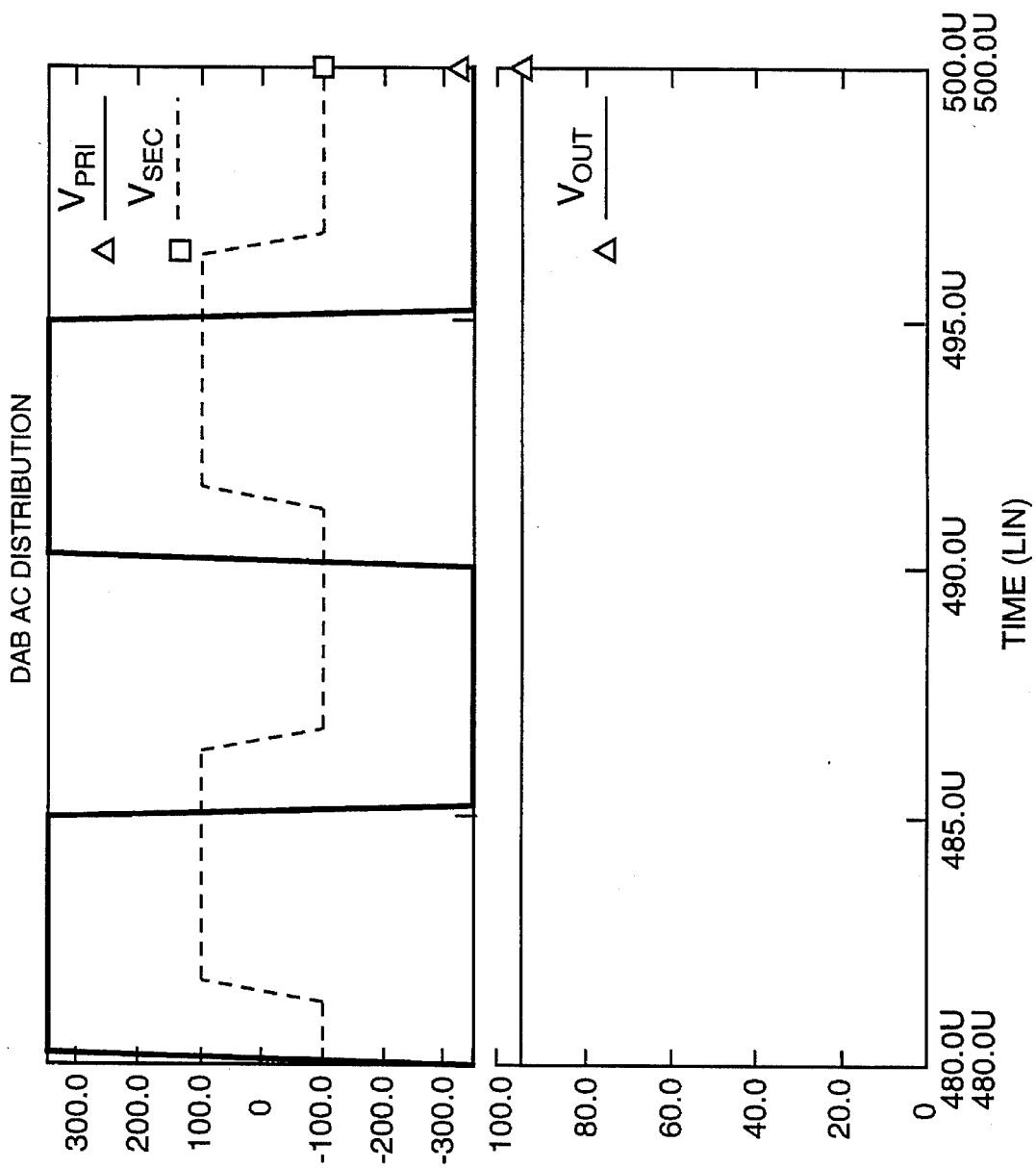
FIG. 2 graphically illustrates simulated electrical characteristics of the power distribution system of FIG. 1.

Advantageously, the DABC converter operates in a soft-switching manner to minimize semiconductor losses and switching stresses. FIG. 2 graphically illustrates the phase shift between the primary-side and secondary-side voltages. For simplicity, the simulation of FIG. 2 involves a single point-of-load converter with a 1:1 load transformer. The top panel of FIG. 2 displays the unregulated (350 volts, 100 kHz) primary ac voltage Vpri of the DABC, and the regulated secondary voltage Vsec (100 volts in this example). The signals are phase shifted relative to each other as required to regulate the ac square wave voltage to 100 volts. The lower panel shows the regulated point-of-load converter output voltage Vout.

Since the DABC regulates the distributed high-frequency ac voltage (rather than distributing an unregulated voltage as in conventional systems), simple conversion electronics may be used at each of the loads. For example, FIG. 1 illustrates simple diode rectifiers 32. However, if even finer regulation is required, simple linear regulators or switching regulators 34, such as the well-known 78XX series of linear regulators, or newer "simple switchers", either being of a type manufactured by National Semiconductor Corporation, may be employed. Power distribution using the DABC ac high-frequency link advantageously provides efficient high-frequency power conversion with low converter weight and high system bandwidth.

Figure 3:
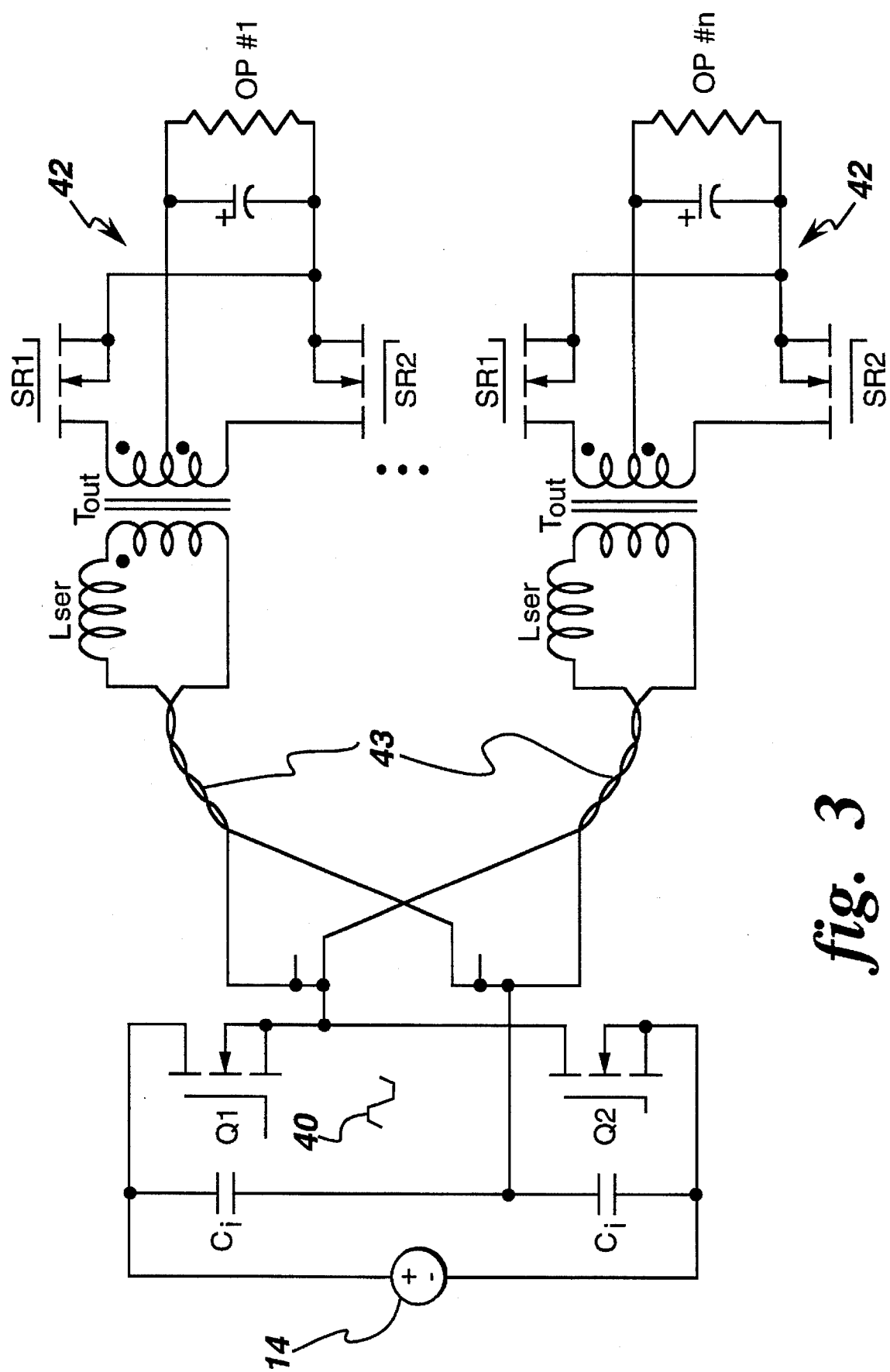
FIG. 3 schematically illustrates another preferred embodiment of a power distribution system according to the present invention.

FIG. 3 illustrates an alternative embodiment of a power distribution system according to the present invention wherein the junctions between DABC primary-side switching devices Q1 and Q2 and input capacitors Ci are coupled across an unregulated high-frequency ac voltage bus 40. The unregulated high-frequency ac voltage bus 40 is distributed via a low-impedance distribution bus 43 comprising, for example, a twisted pair of wires or a coaxial cable, to a plurality of point-of-load converters 42 connected via output transformers Tout to a plurality of DABC secondary-side connections of switching devices SR1 and SR2. High-frequency transformers Tout have a predetermined series inductance Lser on the primary side thereof.

In the embodiment of FIG. 3, the primary side of the DABC provides an unregulated edge-resonant square-wave ac distribution voltage, while the output active stage of the DABC is provided in each of the point-of-load converters. The secondary-side active bridges, preferably implemented using synchronous rectifiers SR1 and SR2 as shown, are phase shifted relative to the unregulated ac distribution bus to provide the regulated output dc voltage.

Advantageously, with the configuration of FIG. 3, the need for connection of the secondary side of the DABC to compensation capacitors is eliminated because the voltage on the unregulated high-frequency ac bus is distributed. Moreover, using synchronous rectifiers on the secondary-side of the DABC results in more efficient rectification; and the synchronous rectifiers allow for very tight regulation of the required output dc voltage, eliminating any need for a separate linear regulator.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power distribution system for generating regulated dc output voltages from an unregulated dc voltage source, comprising:

a dual active bridge converter comprising a primary-side connection of switching devices and a secondary-side connection of switching devices, said primary-side connection of switching devices and said secondary-side connection of switching devices being coupled by an intermediate high-frequency transformer, said primary-side connection of switching devices being adapted for connection to said unregulated dc voltage source;

an intermediate high-frequency ac distribution bus connected to said secondary-side connection of switching devices;

a controller for controlling a phase shift between said primary-side connection of switching devices and said secondary-side connection of switching devices to provide a regulated ac voltage on said intermediate high-frequency ac distribution bus; and a plurality of point-of-load converters each coupled to said high-frequency ac distribution bus via an output transformer and a low-impedance distribution bus for converting said regulated ac voltage to said regulated dc voltages.

2. The power distribution system of claim 1 wherein said point-of-load converters each comprise a diode rectifier coupled to said high-frequency ac distribution bus by an output transformer.

3. The power distribution system of claim 1 wherein said intermediate high-frequency transformer comprises a predetermined series inductance.

4. The power distribution system of claim 1, further comprising a pair of compensation capacitors coupled across said secondary-side switching devices.

5. The power distribution system of claim 1 wherein each of said point-of-load converters comprises a linear regulator at the output thereof for finer output regulation.

6. The power distribution system of claim 1 wherein each of said point-of-load converters comprises a switching regulator at the output thereof for finer output regulation.

7. The power distribution system of claim 1 wherein said low-impedance distribution bus comprises a pair of twisted wires.

8. The power distribution system of claim 1 wherein said low-impedance distribution bus comprises a coaxial cable.

9. A power distribution system for distributing regulated dc output voltages from an unregulated dc voltage source, comprising:

a dual active bridge converter comprising a pair of primary-side switching devices connected in a half-bridge configuration, said half-bridge configuration being adapted for coupling across said unregulated dc voltage source;

an unregulated high-frequency edge-resonant, square wave ac voltage bus coupled to said primary-side half-bridge;

said dual active bridge converter further comprising a plurality of secondary-side half-bridge connections of switching devices each coupled via a low-impedance power distribution bus and an intermediate high-frequency transformer to said unregulated high-frequency ac voltage bus; and a controller for controlling the phase shift between said secondary-side switching devices and said unregulated high-frequency ac voltage bus to provide regulated dc voltages at the outputs of said secondary-side connections of switching devices 10. The power distribution system of claim 9 wherein said secondary-side switching devices comprise synchronous rectifiers.

11. The power distribution system of claim. 9 wherein said intermediate high-frequency transformer comprises a predetermined series inductance.

12. The power distribution system of claim 9 wherein said low-impedance distribution bus comprises a pair of twisted wires.

13. The power distribution system of claim 9 wherein said low-impedance distribution bus comprises a coaxial cable.

* * * * *